US012410736B2

(12) United States Patent
Solberg (10) Patent No.: US 12,410,736 B2
(45) Date of Patent: Sep. 9, 2025

(54) CRANKCASE PRESSURE REGULATOR HAVING UMBRELLA STYLE VALVE (71) Applicant: Solberg Mfg., Inc., Itasca, IL (US)

(72) Inventor: Charles H. Solberg, Tower Lakes, IL (US)

(73) Assignee: Solberg Mfg., Inc., Itasca, IL (US)

( * ) Notice: Subject to any disclaimer, the term of this patent is extended or adjusted under 35 U.S.C. 154(b) by 0 days.

(21) Appl. No.: 18/859,444

(22) PCT Filed: Apr. 26, 2023

(86) PCT No.: PCT/US2023/020029
§ 371 (c)(1),
(2) Date: Oct. 23, 2024

(87) PCT Pub. No.: WO2023/212086
PCT Pub. Date: Nov. 2, 2023

(65) Prior Publication Data
US 2025/0109702 A1 Apr. 3, 2025

Related U.S. Application Data (60) Provisional application No. 63/335,179, filed on Apr. 26, 2022.

(51) Int. Cl.
*B01D 35/14* (2006.01)
*B01D 35/147* (2006.01)
(Continued)

(52) U.S. Cl.
CPC ....... *F01M 13/021* (2013.01); *B01D 35/1475* (2013.01); *F01M 13/04* (2013.01)

(58) Field of Classification Search
CPC .............. F01M 13/04; F01M 13/0011; F01M 2013/0438; F01M 2013/0016;
(Continued)

(56) References Cited

U.S. PATENT DOCUMENTS 3,108,581 A 10/1963 Humphreys
3,189,012 A 6/1965 Humphreys
(Continued)

FOREIGN PATENT DOCUMENTS

DE 202004010550 U1 * 12/2005 ............. F01M 13/02
EP 3922335 A2 12/2021

OTHER PUBLICATIONS

PCT International Patent Application No. PCT/US23/20029, International Search Report and Written Opinion of the International Searching Authority dated Jul. 24, 2023, 10 pages.

*Primary Examiner* — Lindsay M Low
*Assistant Examiner* — Teuta B Holbrook
(74) *Attorney, Agent, or Firm* — James B. Conte; Craig R. Miles; CR MILES P.C.

(57) ABSTRACT

An integrated assembly includes a primary housing which carries the filter element. A partition resides in a secondary housing which seals off an atmospheric chamber from a pressure regulator chamber. The partition is moveable in a first axial direction and a second axial direction opposite the first axial direction response to a change in a pressure drop across the filter element. A valve assembly changes from a closed configuration to partially open configurations, and to a fully open configuration responsive to movement of the partition. The movement of the valve keeps a pressure in a crankcase downstream of said filter.

14 Claims, 4 Drawing Sheets (51) Int. Cl.
*F01M 13/02* (2006.01)
*F01M 13/04* (2006.01)

(58) Field of Classification Search
CPC .......... F01M 2013/0044; F01M 13/00; F01M 13/021; B01D 35/005; B01D 35/1475
USPC ................. 123/572, 574, 41.86; 55/DIG. 19
See application file for complete search history.

(56) References Cited

U.S. PATENT DOCUMENTS

| | | | |
|---|---|---|---|
| 3,587,628 A | 6/1971 | Farrer et al. | |
| 4,064,853 A | 12/1977 | Hatz | |
| 4,295,457 A | 10/1981 | Schleiermacher | |
| 4,502,841 A | 3/1985 | Kebedjis | |
| 4,502,955 A * | 3/1985 | Schaupp | B01D 36/005 210/DIG. 5 |
| 4,502,956 A | 3/1985 | Wilson et al. | |
| 4,550,749 A | 11/1985 | Krikorian | |
| 5,090,393 A | 2/1992 | Holch | |
| 5,319,949 A | 6/1994 | Long et al. | |
| 5,347,973 A | 9/1994 | Walker, Jr. | |
| 5,542,401 A | 8/1996 | Newarski | |
| 5,564,401 A * | 10/1996 | Dickson | F01M 13/023 123/573 |
| 6,216,648 B1 | 4/2001 | Spaulding | |
| 6,422,224 B1 | 7/2002 | Walker, Jr. | |
| 6,557,536 B2 | 5/2003 | Burgess | |
| 6,684,865 B2 | 2/2004 | Hilpert | |
| 7,422,612 B2 | 9/2008 | Pietschner | |
| 8,297,264 B2 | 10/2012 | Imhof | |
| 8,607,767 B2 | 12/2013 | Ruppel et al. | |
| 10,352,209 B2 | 7/2019 | Solberg et al. | |
| 2004/0112347 A1* | 6/2004 | Hakansson | F01M 13/022 123/572 |
| 2005/0000876 A1 | 1/2005 | Knight | |
| 2011/0023425 A1* | 2/2011 | De Paepe | B01D 46/0087 55/312 |
| 2014/0026857 A1 | 1/2014 | Tsutsui et al. | |
| 2015/0345351 A1 | 12/2015 | Mincher | |
| 2016/0090881 A1 | 3/2016 | Copley et al. | |
| 2017/0145878 A1 | 5/2017 | Solberg et al. | |
| 2019/0323395 A1 | 10/2019 | Zuerker et al. | |

\* cited by examiner

CRANKCASE PRESSURE REGULATOR HAVING UMBRELLA STYLE VALVE

This application is the United States National Stage of International Patent Cooperation Treaty Patent Application No. PCT/US23/20029, filed Apr. 26, 2023, which claims the benefit of U.S. Provisional Patent Application No. 63/335,179, filed Apr. 26, 2022, each hereby incorporated by reference herein.

I. TECHNICAL FIELD

The present invention relates to engines, and more particularly, to regulating the pressure within the crankcases of internal combustion engines by means of a pressure regulator assembly for a crank case. More particularly, the regulator comprises a moveable member which cooperates with a seat to provide a variable orifice to maintain a near constant vacuum (negative pressure) in the crank case.

II. BACKGROUND

Closed crankcase emission control systems require a high efficiency filter and crankcase pressure regulator. The high efficiency filter is required to filter out small sized particles to prevent contamination of the air, turbochargers, aftercooler, and internal engine components. The pressure regulator maintains acceptable levels of crankcase pressure.

In one example of the prior art, a pressure control assembly uses a diaphragm, and a spring biasing means to maintain a constant vacuum in the system. The spring would cooperate with the diaphragm causing a valve within the diaphragm to move a variable orifice to maintain constant pressure. The problem with using a diaphragm and spring is that this type of system requires the use of a lot of small moving parts. The springs would eventually wear over time and need to be replaced before they failed.

In another example of the prior art, to make sure the vacuum in the crank case remains at a set negative pressure the valve member moves between at least fully closed, partially open and fully open positions. In a partially open position, as compared to a fully open position, the pressure drops between the points upstream of the valve to the point downstream of the valve. The regulator chamber and an atmospheric chamber are formed in a housing. A diaphragm coupled to the housing, delimits the regulator chamber from the atmospheric chamber. The diaphragm and housing also delimit the atmospheric chamber which is opposite and below the regulator chamber. During operation, the positive atmospheric pressure in the atmospheric chamber can cause a plate and diaphragm and any weights to move upward, the movement causes the valve member to move up thereby placing the valve in a partially open or closed position from an open position or partially open position.

U.S. Pat. No. 10,352,209, Pressure Regulator Assemblies, Jul. 16, 2019, Solberg, discloses a filter in combination with a pressure regulator. The combination includes: a primary housing which carries an air/oil separation element. A valve member extends into a throat of the element. A secondary housing forms a regulator chamber and an atmospheric chamber. A partition of the secondary housing delimits and fluidly seals the atmospheric chamber from the regulator chamber. The partition is moveable in opposite axial directions responsive to a change in a pressure differential between the atmospheric chamber and regulator chamber without the use of a spring. The valve opens into and is in fluid connection with the regulator chamber. The secondary housing is carried by the primary housing. Alternatively, a fluid port can open out of the secondary housing and the valve does not open into the regulator chamber. Applicant hereby incorporates herein by reference in its entirety U.S. Pat. No. 10,352,209, Pressure Regulator Assemblies, Jul. 16, 2019, Solberg et al.

III. DISCLOSURE OF THE INVENTION

An embodiment of the invention includes a pressure regulator for a crankcase integrated with a filter assembly which includes an internal hollow having a first portion and a second portion delimited by a filter element housing. A filter element is in said housing. An atmospheric chamber is delimited by a regulator housing. A pressure regulator chamber is delimited by said regulator housing. A partition in said regulator housing fluidly seals off said pressure regulator chamber from said atmospheric chamber. A valve assembly having a valve head and a valve orifice both in said internal hollow delimited by said filter housing, said valve head connected to said partition; said valve orifice having a first open access and a second open access. The assembly adjustable to place the valve orifice in a valve orifice closed orientation, a first partially open orientation, a second partially open orientation, and an open orientation. An intake orifice is delimited by said filter housing opening into said hollow first portion. An exhaust orifice is delimited by said filter housing opening into said hollow second portion. A reference inlet is in fluid connection with said pressure regulator chamber. The valve orifice provides a fluid access to said filter element. The partition is moveable in a first axial direction and a second axial direction opposite the first axial direction responsive to a change in a pressure differential between the pressure in the regulator chamber and the pressure in the atmospheric chamber. Movement of the partition in said first axial direction moves said valve head in a first axial direction, and said movement of said partition in said second axial direction moves said valve head in a second axial direction opposite said first valve head first axial direction. Movement of said valve head in said first axial direction moves said head relative to said valve orifice to place the orifice into the partially first open orientation from the closed orientation. Movement of the valve head in the first axial moves said valve head relative to the valve orifice to place the valve assembly orifice into the second partially open orientation from the first partially open orientation. Movement of said valve head in said first axial direction moves said valve head relative to said valve assembly orifice to orient said orifice from said second partially open position to said open position. When the valve orifice is in the partially open positions or open position, fluid prior to passing to said exhaust orifice passes through said valve orifice and then through a sidewall of said filter element.

Another embodiment of the invention includes a pressure regulator having a main hollow delimited by part of said pressure regulator. An intake orifice opens into the main hollow. An exhaust orifice opens out of said main hollow. A regulator housing connects to said portion of said pressure regulator assembly delimiting the main hollow, said regulator housing delimits an atmospheric chamber and a pressure regulator chamber. A partition seals off said atmospheric chamber from said pressure regulator chamber. A valve head connects to a valve stem. The stem connects to the partition. A valve orifice provides an access through which fluid must flow prior to passing out said exhaust. The valve orifice orients to be placed in a closed orientation, a first partially open orientation, a second partially open orientation, and an open orientation. Movement of said partition in a first axial direction moves said valve head in a first axial direction and said movement of said partition in a second axial direction moves said valve head in a second axial direction opposite said first axial direction. Movement of said valve head in said first axial direction moves said head relative to said valve orifice to place said orifice into said partially first open orientation from said closed orientation. Movement of said valve head in the first axial direction moves said valve head relative to said valve orifice to place said valve orifice into said second partially open orientation from said first partially open orientation. Movement of said valve head in said first axial direction moves said valve head relative to said valve orifice to orient said orifice from said second partially open position to said open position.

Naturally, further objects and examples of the invention are disclosed throughout other areas of the specification, drawings, and claims.

IV. BRIEF DESCRIPTION OF THE DRAWINGS

The present invention is described with reference to the following figures.

Before any embodiments of the invention are explained in detail, it is to be understood that the invention is not limited in its application to the details of construction and arrangement of components set forth in the following description or as illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

V. MODE(S) FOR CARRYING OUT THE INVENTION

Figure 1:
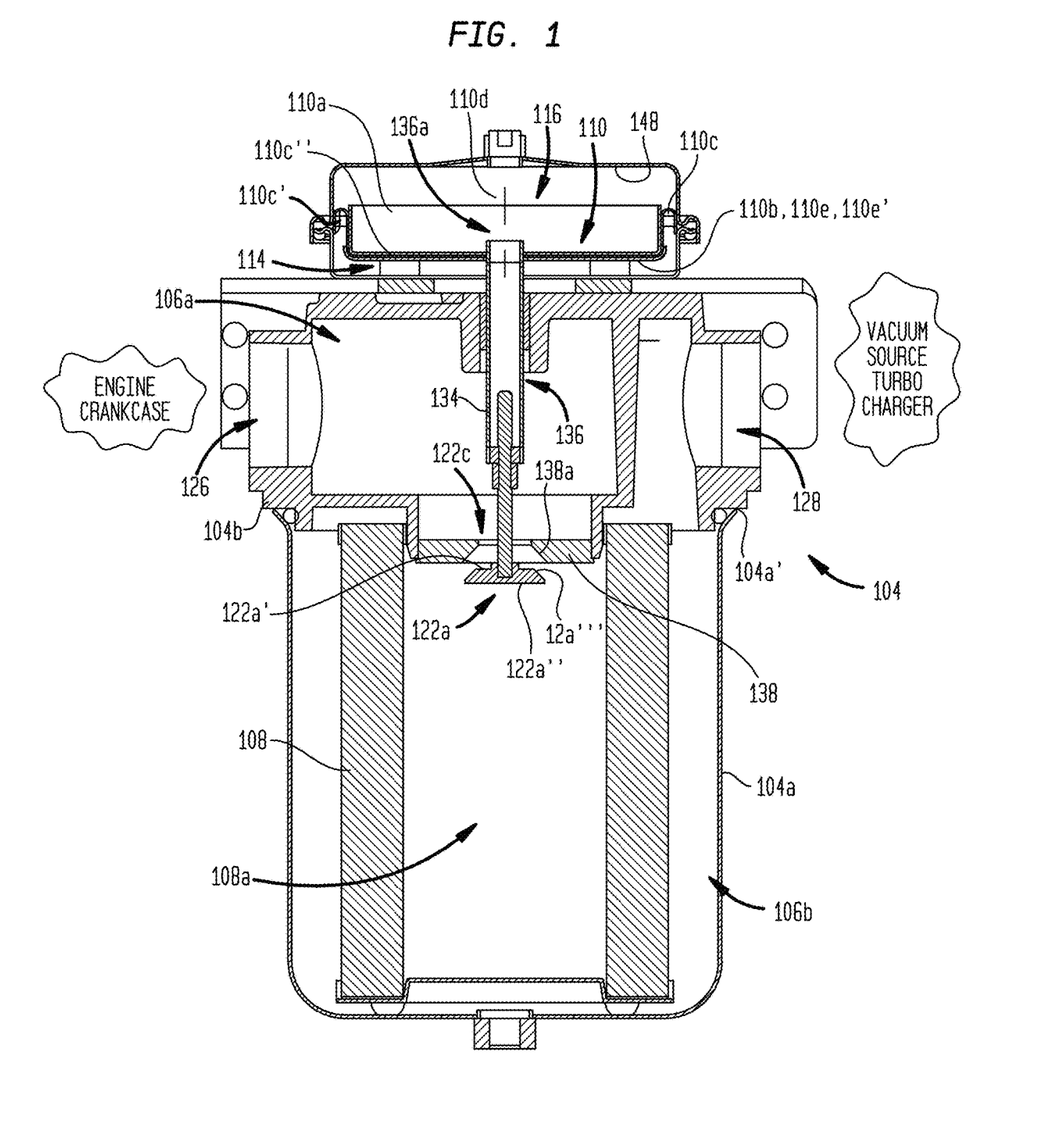
FIG. 1 shows a cross-sectional view of a pressure regulator integrated with a filter element residing in a filter element housing downstream of an engine crankcase and upstream of a vacuum source embodying features of the present invention.
Figure 2:
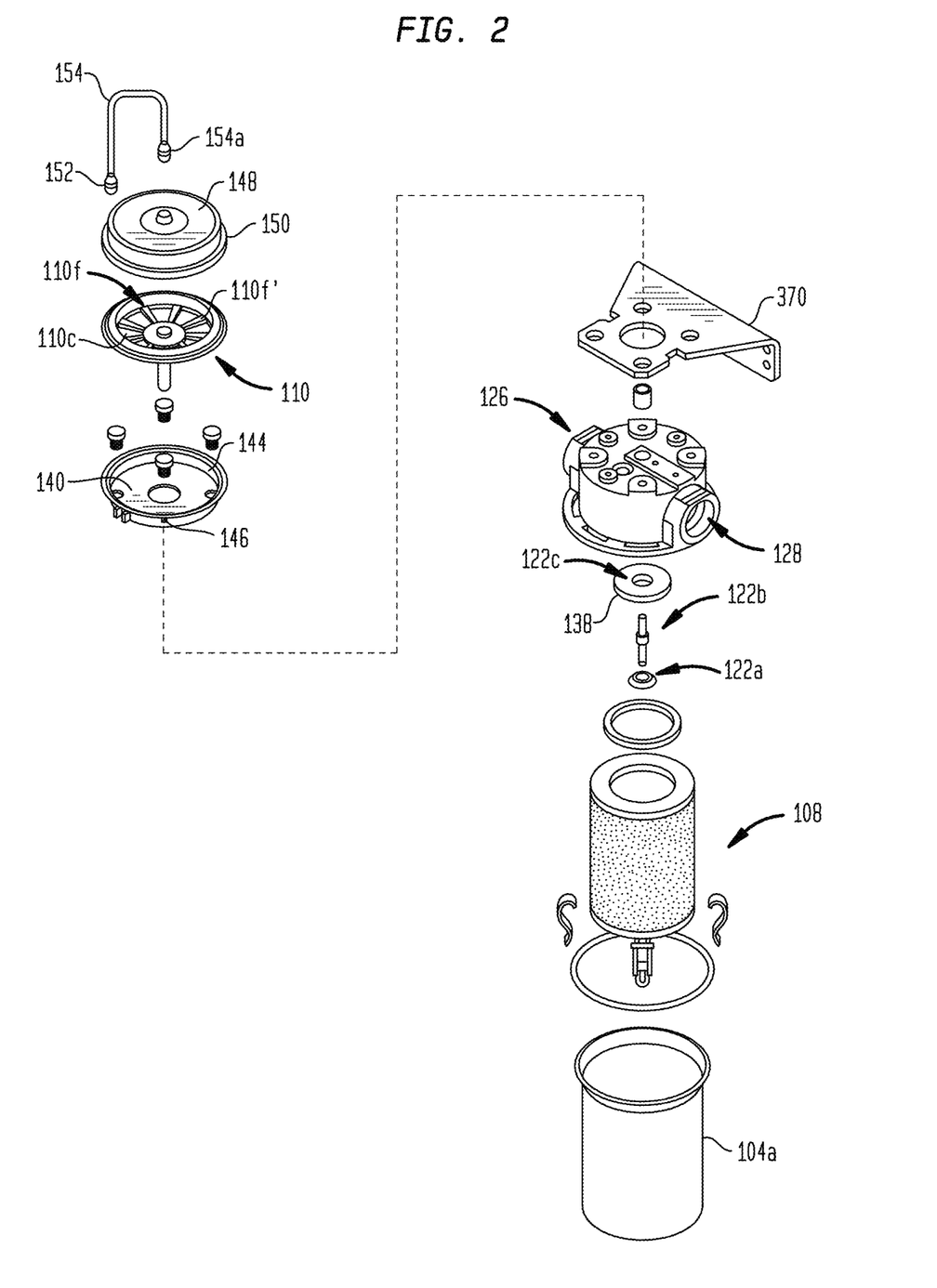
FIG. 2 shows an exploded view of the pressure regulator integrated with the filter element residing in the filter element housing of FIG. 1.
Figure 3:
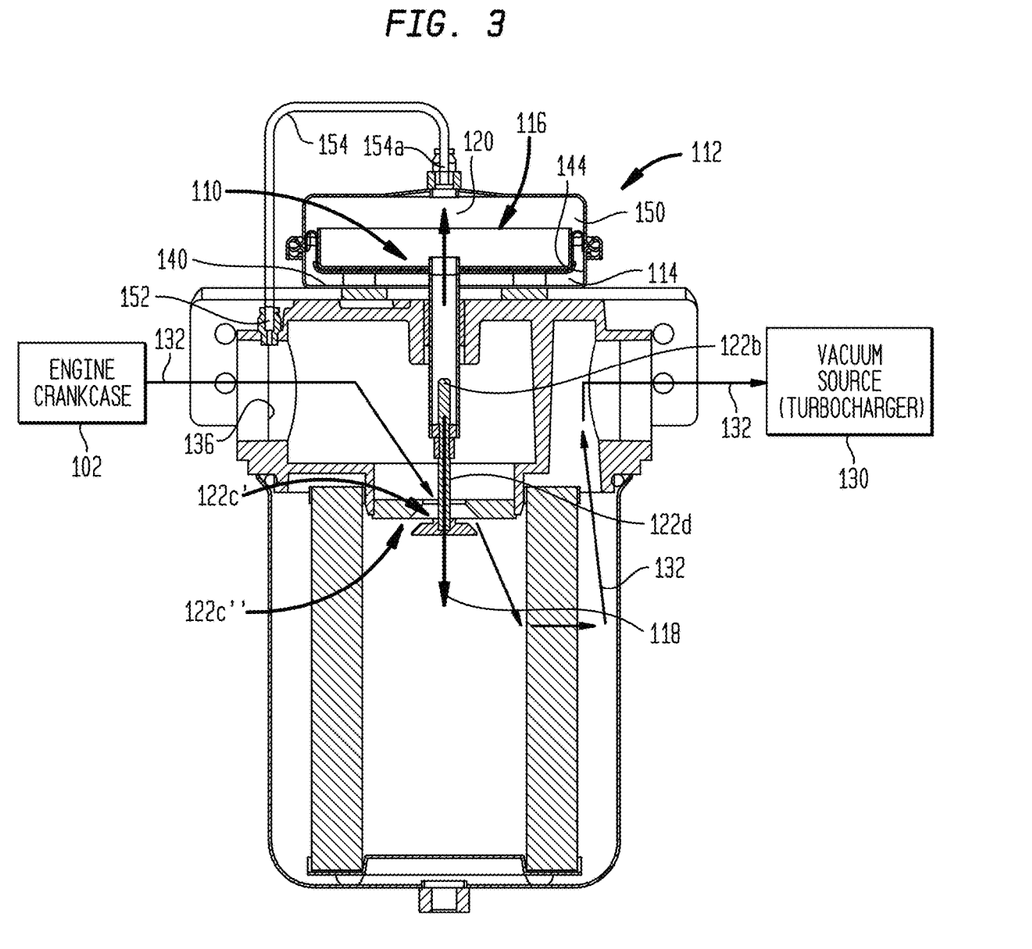
FIG. 3 shows a cross-sectional view of a pressure regulator integrated with a filter element residing in a filter element housing downstream of an engine crankcase and upstream of a vacuum source similar to the assembly shown in FIG. 1; the FIG. 3 assembly uses a sensing tube to sense a reference pressure as opposed to a sensing orifice in a tube extending down into the filter housing assembly from the regulator chamber; the assembly embodying features of the present invention.

FIGS. 1-3 show an embodiment of a pressure regulator for a crankcase integrated with a filter assembly (100) which embodies features of the present invention. The integrated assembly serves to filter air drawn into the assembly from a crankcase (102) of an engine and exhaust the filtered air, all the while maintaining a desired pressure in the crankcase, usually a negative pressure. The exhausted emissions can be forced back into the engine by a turbo charger.

The integrated assembly includes a primary housing (104) which can be called a filter element housing (104). The primary housing delimits an internal hollow (106a, 106b). In the housing hollow resides an air/oil separation element (108). The housing (104) carries the filter element (108). A partition (110) resides in a secondary housing (112) which can be called a regulator housing (112). The partition (110) seals off an atmospheric chamber (114) from a pressure regulator chamber (116). The partition (110) is moveable in a first axial direction (118) and a second axial direction (120) opposite the first axial direction. The partition moves responsive to a change in pressure in the pressure regulator chamber relative to the atmospheric pressure in the atmospheric chamber without the aid of a spring. A springless valve assembly (122a, 122b, 122c) resides in the housing hollow. The valve assembly (122a, 122b, 122c) changes from a closed configuration to partially open configurations, and to a fully open configuration responsive to movement of the partition (110). It also changes to a closed configuration from an open configuration, and to configurations in-between, responsive to movement of the partition (110). A bracket (370) resides between the primary housing (104) and the secondary housing (112) and facilitates coupling of the items together.

In more detail a portion of the primary housing (104) forms an intake orifice (126) which opens into the housing hollow (106a, 106b). An exhaust orifice (128) formed by a portion of the housing (104) opens out of the housing hollow (106a, 106b). The secondary housing (112) resides at an end of the primary housing (104) and over the primary housing (104). The secondary housing (112) connects to the primary housing (104). The secondary housing (112) delimits the pressure regulator chamber (116) and an atmospheric chamber (114) fluidly sealed off from the pressure regulator chamber (116). The partition (110) on a first side, has a first side surface (110a) facing in the first axial direction; the side surface forms a boundary surface of the regulator chamber (116). The partition on a second side opposite the first side has a second side surface (110b) opposite the first side surface which forms a boundary surface of the atmospheric chamber. The partition includes a flexible and resilient diaphragm (110c) which seals off the pressure regulator chamber (116) from the atmospheric chamber (114). The axial movement of the partition (110) in the first (118) and second (120) axial directions moves a valve (122a, 122b) of the valve assembly in the axial first (118) and opposite axial second (120) direction.

In operation a vacuum source (130), such as a turbo charger, draws crankcase emissions from crankcase (102) downstream into the intake orifice (124). From the intake orifice (124) the emissions travel downstream through a first portion (106a) of the hollow. The first portion forms a delimited flow path which opens at or over an access into the throat (108a) of the filter element. The valve assembly orifice (122c) overlaps, can be over, can be under, can be at, and proximate the open end of the filter throat. The orifice (112) provides an exclusive access into the throat (108a) of the filter element (108). When the valve assembly is in an open or partially open configuration, crankcase emissions (132) flow out the delimited flow path (106a) and through the orifice (122c) of the valve assembly and into the throat (108a) of the filter element and over the valve (122a, 122b) of the valve assembly. The emissions (132) enter the orifice (122c) through a first access (122c') and exit the orifice (122c) through a second access (122c"). The valve can include a valve head (122a) and valve stem (122b). The emissions (132) flow over the valve head (122a) and around the valve stem (122b). The emissions from the throat (108a) pass through a continuous circumferential filtering wall of the filter element. The wall can be a sidewall. The filter resides in a second portion (106b) of the hollow. The emissions (132) pass through the filtering wall in the second portion of the hollow. From the second portion (106b), the emissions flow out of the exhaust orifice (128). All emissions which pass into the second hollow portion (106b) from the first hollow portion (106a) pass through orifice (122c) of the valve assembly. The emissions can be injected back into the engine (102) by the vacuum source (130) such as a turbocharger. The emissions (132) travel the path from the intake orifice (126) and out the exhaust orifice (128) without entering the atmospheric pressure chamber (114). The chamber (114) is sealed off from the flow path.

In more detail the valve (122a, 122b) is fixedly connected to the partition (110). The pressure in the pressure regulator chamber (116) can be a negative pressure. As the pressure in the pressure regulator chamber (116) increases in negative magnitude to a certain negative pressure, the atmospheric pressure at the partition in the atmospheric chamber (114) overcomes the forces, such as the weight of the partition, acting on the partition (110) in the first axial direction (118) causing the partition (110) to move in a second axial direction (120) opposite the first axial direction along the axis (110d) of the partition. The movement of the partition (110) in the second axial direction (120) causes the valve head (122a) of the valve assembly to move in the second axial direction (120) along the axis (122d) of the valve head (122a). The valve head (122a), assuming the valve assembly is in an open or partially open configuration, moves toward the first access (122') opening into the valve assembly orifice (122c). Depending on the magnitude of movement, in units of distance, that the partition moves in the second direction (120), the valve head (122a) moves further into the orifice (122c) of the valve assembly in the second direction (120). If the valve head (122a) moves into the orifice (122c) to fully close the orifice (122c), the valve head blocks emissions from passing through the orifice (122c) and into the throat (108a) of the filter.

As the magnitude of the negative pressure decreases, the forces acting on the partition (110) in the first direction (118), such as the weight of the partition including any weights thereon, begins to overcome the atmospheric pressure in the atmospheric pressure chamber (114) acting on the partition (110) in the second direction (120), the partition (110) therefor begins to move in the first direction (118) along the longitudinal axis (110d) of the partition (110). The valve moves in the first direction (118) away from the first access (122'). As the valve begins to move away from the first access (122') in the first direction (118) a portion of the valve head (122a) moves out the orifice. The further the valve head (122a) moves away from the first access (122c') in the first axial direction (118) the more of the valve head (122a) moves out of the orifice (122c). When the valve head (122a) completely resides out of the orifice (122c) of the valve assembly, the orifice (122c) is completely open, and the valve assembly resides in an open configuration.

The pressure in the regulator chamber changes as a reference pressure changes. A reference inlet (134) resides in a central first portion (106a) of the hollow downstream of the intake orifice (126) and upstream of the second access (122c''') opening out of the orifice (122c) to detect the reference pressure. The inlet (134) also resides upstream of the first access (122c') opening into the orifice (122c). The inlet opens into a tube (136). The tube internal surface delimits a channel and hollow. The tube extends through the atmospheric chamber (114) and opens into the pressure regulator chamber (116). The tube (136) and its hollow and inlet (134) are fluidly sealed off from atmospheric chamber (114) such that fluid does not pass from the atmospheric chamber (114) into the tube (136) or its hollow. Also, fluid from the tube (136) and its hollow does not pass into the atmospheric chamber (114). The inlet (134) represents a proxy pressure for the pressure (negative, positive) in the crankcase (102).

The valve head (122a) of the valve orients relative to the valve orifice (122c) to close the orifice (122c), partially open the orifice (122c), a more partially open the orifice (122c) and fully open the orifice (122c). When the orifice (122c) is closed, the valve head (122a) resides in the orifice (122c) and seals off the orifice (122c) to prevent emissions from passing through the orifice (122c). When partially open, the valve head (122a) resides in the orifice (122c) and partially restricts the emissions from passing through the orifice (122c). When partially open, a first end of the head (122a), into which the valve stem (122b) extends, is more axially spaced from the first access (122c') in the second axial direction (120) than when the orifice (122c) is closed. When the orifice (122c) is even more partially open, the first end of the valve head (122a) resides further away from the first access (122c') in the second axial direction (120) than when the orifice (122c) was less partially open. The flow of emissions through the orifice (122c) is less restricted than when the orifice was less open. When in a fully open position, the head (122a) at the first end is a maximal distance from the first access (122c') in the second axial direction (120). The flow of emissions through orifice (122c) is even less restricted.

In more detail, the valve head (122a) has a second end' axially opposite a first end. The second end includes an end surface (122a") encompassed by a perimeter. The perimeter is circumferential with a diameter extending a length. The perimeter encompasses an area. The valve has a surface (122a') at the first end encompassed by a perimeter. The perimeter is circumferential with a diameter extending a length and encloses an area. The diameter of the first surface (122a') has a length less than the diameter of the second surface (122a"). The first and second surfaces are oppositely facing. The first surface faces the second direction (120). The second surface faces the first direction (118). The valve head (122a) includes a continuous side surface (122a''') between and interconnecting the first (122a') and second end surfaces (122a"). The side surface (122a''') tapers radially inward as it approaches the first surface (122a') from the second surface (122a"). The valve external surface delimits a frusto-conical shape. The valve head (122a) can be considered umbrella style. The valve stem (122b) extends in the axial direction along its longitudinal axis from the valve head first end in the second axial direction (120) and connects to the tube (136) at a tube end opposite the open end (136a) which opens into the pressure regulator chamber (116). The stem extends through a protrusion of the valve head first surface (122a'). The tube (136) interconnects the valve head (122a) and stem (122b) to the partition (110).

The orifice (122c) of the valve assembly is formed with a plate (138). The orifice (122c) opens through the plate (138). The orifice first access (122') opens through a first end surface of the plate. The orifice second access (122c") opens through a second end surface of the plate. A continuous side surface (138a) of the plate extends in the axial direction from the second open access (122c") to the first open access (122c'). The side surface (138a) tapers radially inward as it approaches the first open access surface from the second open access. The side surface (138a) delimits said orifice (122c). The orifice is a channel through which emissions can pass.

When the orifice (122c) is closed, the orifice first access (122c') is proximate the valve head first surface (122a') and distal the valve head second surface (122a"). The orifice second access (122c") resides distal the head first surface (122a') and proximate the head second surface (122a"). When the orifice (122c) is fully open, the orifice second access (122c") is proximate the valve head first surface (122a') and the orifice first access (122c') is distal the valve head first surface (122a').

In more detail, the atmospheric chamber (114) at a first end has a delimiting first surface which delimits a first end of the atmospheric chamber. The first surface is formed on a first wall (140) of the regulator housing. The wall is flat and planar and rigid. A continuous side surface delimits a side of the atmospheric chamber. The side surface is rigid and is formed on a sidewall (144) of the regulator housing and is curvilinear and circumferential. It is continuous except where apertures (146) open through the sidewall. The apertures place the atmospheric chamber (114) in fluid communication with atmosphere or the environment external to the regulator housing.

The atmospheric chamber (114) at a second end has a second end surface (110b) which delimits the chamber at its second end. The second surface is formed from the partition (110). The second end surface comprises an elastomeric surface (110c') formed from the diaphragm (110c). It also comprises a rigid surface (110e') which overlays portions of the elastomeric surface. The rigid surface is formed on a rigid wall (110e). The rigid wall delimits open void spaces over which the elastic surface lays. The elastomeric surface (110e) formed on the diaphragm extends between the rigid sidewall (144) and second end surface (110a). Spokes formed by the wall (110e) delimit the void spaces overlapped by the diaphragm surface (110c') delimited by spokes formed by the wall. The diaphragm (110c) and rigid wall (110e) form part of the partition (110). The void space volume enclosed in the atmospheric chamber (114) increases and decreases as the as the valve head (122a) moves in the axial directions.

The regulator chamber (116) at a first end has a delimiting end surface which delimits the first end of the chamber. The end surface is formed on a second wall (148). The second wall (148) is rigid and formed from the regulator housing. The regulator chamber (116) is also delimited by a side surface. The side surface is formed with a sidewall (150) of the regulator housing. The surface is curvilinear and circumferential and continuous. A second end surface (110a) delimits the regulator chamber (116). The surface (110b) comprises an elastomeric surface (110c") formed from the diaphragm (110c). It also comprises a rigid surface (110f'). The rigid surface is formed on a rigid wall (110f). The rigid wall delimits open void spaces over which the elastic surface lays (110c"). An elastomeric surface (110c") formed on the diaphragm extends between the rigid sidewall (150) and second end surface (110a). Spokes formed by the wall delimit the void space delimited by spokes formed by the wall.

In more detail the filter housing (104) includes a cannister (104a) in which seats the filter (108). The housing (104) includes a cover (104b). The cover (104b) delimits the intake orifice (126) and the exhaust orifice (128). The cover (104b) seats over the cannister (104a). The cover (104b) seats at an end portion (104a') of the cannister delimiting an access into a hollow of the canister in which the filter element (108) seats.

The pressure regulator assembly (114, 116, 122a, 122b, 122c) serves to maintain the crankcase (102) at a desired pressure, usually a negative pressure, while the negative vacuum source (130) draws the emissions from the crankcase (102) through the filter element (108). To maintain the pressure, the valve head (122a) moves in and out of the valve assembly orifice (122c) in varying degrees to make sure the negative pressure in the crankcase (102) remains at a set predetermined pressure for example negative 3 inches of water. The measurement could be in inches of mercury. In one example of operation, the desired pressure in the crankcase (102) is negative 3 inches. The pressure drop across the filter (108) is negative 2 inches and the negative pressure of the negative pressure source (130) is negative 10 inches. The pressure drop across the valve assembly orifice (122c) in a first partially open orientation, is negative 2. Accordingly, the valve assembly orifice (122c), if left in this first open orientation, will mean an increase in the crankcase negative pressure above the desired pressure. The increase is undesirable because it removes too much dirty emissions. To prevent the increase in negative pressure, the valve head (122a) moves in the second axial direction into the valve assembly orifice (122c) to partially fill the orifice (122c) more than the valve previously filled the orifice when the orifice (122c) was in the first open orientation. The orifice is in a second partially open position. The valve assembly is oriented to a less open orientation from the more fully open position when the orifice (122c) was oriented in the first open position. The valve head moves in the axial second direction (120) because the atmospheric pressure overcomes the axial force exerted by the partition (110) and moves the partition in the axial second direction (120) which pulls the valve head (122a) in the second axial direction more into the orifice (122c) than previously oriented. The valve assembly orients to a less partially open orientation from a more partially open orientation which is within a range of predetermined open positions. The less partially open orientation as compared to the more open orientation provides an increase in the pressure drop across the valve assembly orifice to ensure the crankcase pressure, which is referenced by regulator chamber inlet orifice (134), stays at the desired negative pressure or within a constant range. The valve head (122a) is oriented such that its longitudinal axis (122d) extends through the orifice's first (122c') and second (122c") accesses.

In another scenario, if the filter becomes clogged, the pressure drop across the filter (108) increases. Thus, the negative pressure in the crankcase (102), if the valve head (122a) were left in place relative to the orifice (122c), would change to less than negative 3 inches. It could for instance be negative one. To prevent the change, the valve ahead (122a) moves in the first direction (118) to orient the valve head (122a) more out of the orifice (122c) than when previously positioned. The valve moves in the first direction (118) because the force exerted in the axial direction by the partition (110) increases and overcomes the atmospheric force in the atmospheric chamber (114) causing the partition (110) to move in the first axial direction. The movement causes the valve head (122a) to move in the first direction (118) and away from the first access (122c') making the orifice (122c) more open than in the previous orientation. Increasing the orifice (122c) to a more open orientation provides a decrease in the pressure drop across the valve orifice (122c) to less negative to ensure the crankcase pressure, which is referenced by the inlet (134), stays at the desired negative pressure. The pressure regulator assembly, including the pressure regulator chamber (116), the partition (110), the atmospheric chamber (114), and the valve assembly (122a, 122b, 122c) interface and operate without the aid of a spring. Those in the art frequently refer to the negative pressure source as a vacuum source.

In an alternative embodiment, the pressure reference point is not at an inlet (134) of a tube (136) which extends through the atmospheric chamber (114) and into the first portion (106a) of the hollow. The inlet (152) opens into a tube (154) having a first end (154a) which opens into the pressure regulator chamber (116) through end wall (148). The tube (154) extends from the first end (154a) outside the regulator housing (112) and outside the filter housing (104) to orient the inlet (152) remote from the first portion (106a) of the hollow. In the present example the inlet (152) resides at an access into the intake orifice (126). Tube (136) is not in fluid connection with the pressure regulator chamber.

Figure 4:
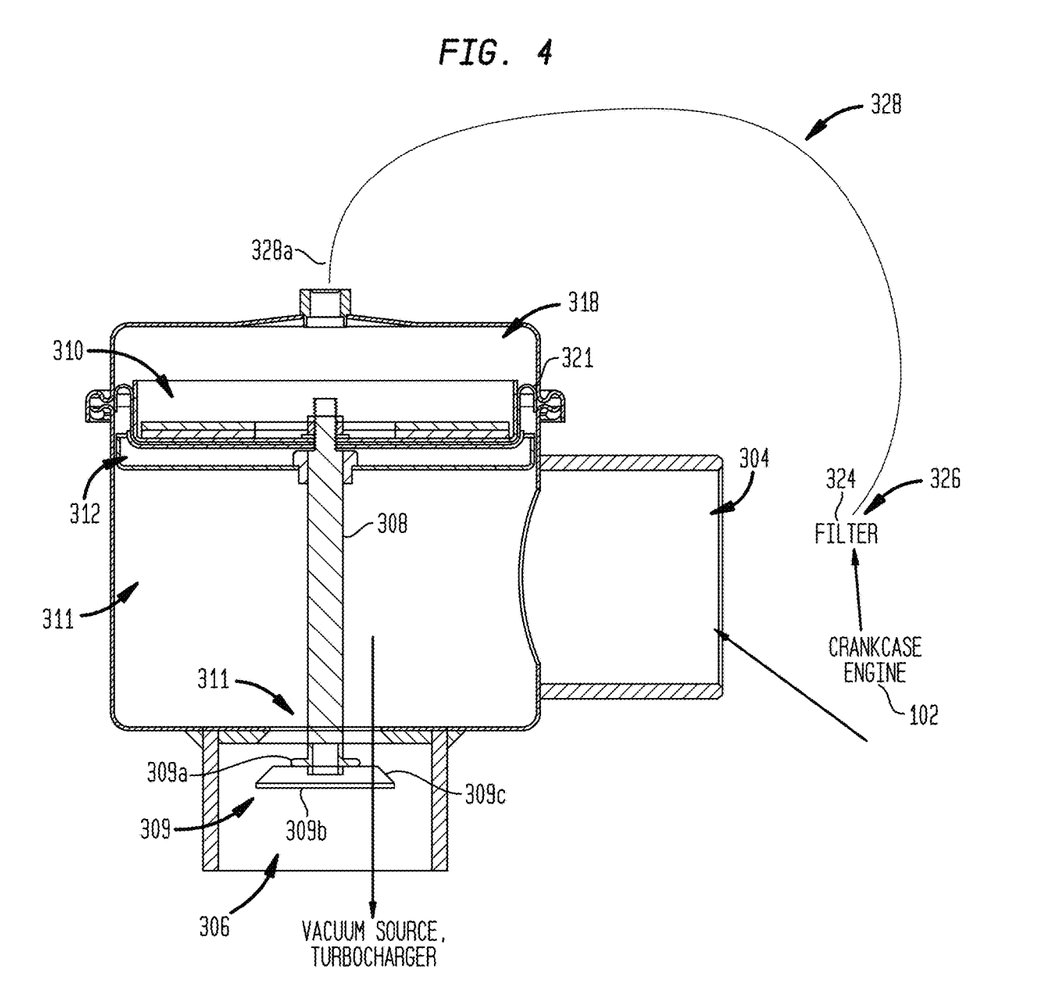
FIG. 4 shows a cross-sectional view of a standalone pressure regulator downstream of a crankcase and filter and upstream of a vacuum source such as a turbo charger embodying features of the present invention.

In a further alternative embodiment, the pressure regulator assembly stands alone. In this embodiment the regulator assembly delimits a main hollow (300). An intake orifice (304) opens into the main hollow (300) and an exhaust orifice (306) opens out of the main hollow (300). A valve assembly of the pressure regulator assembly includes a valve stem (308) connected to a partition (310) of the regulator assembly. The stem, which is a rod, extends through the atmospheric chamber (312) into the main hollow (300). The valve stem (308) extends to and connects to a valve head (309). An orifice (311) of the valve assembly overlaps the hollow of the exhaust orifice (308). The orifice (311) delimits an access into the exhaust orifice (308). The orifice (311) is proximate an end of the exhaust orifice (308) and distal an opposite end of the exhaust orifice (308). The valve orifice (311) has the same shape as the orifice (122c). The valve head (309) has a first end surface (309a) the same as end surface (122a') without the protrusion. The head has a second end surface (309b) and a tapered side surface (309C) the same as head (122a). A partition (314) which functions in the same manner as partition (110) isolates an atmospheric chamber (312) from the pressure regulator chamber (318). The partition (314) includes a diaphragm (321) which seals off the atmospheric chamber (312) from the pressure regulator chamber (318). The pressure regulator chamber (318) and atmospheric chamber (312) serve the same function as the pressure regulator (116) and atmosphere chamber (114). The chambers (312) and (318) are delimited by a regular housing above the main hollow. In summary the partition (310) moves up and down due to a change in the pressure differential between the pressure regulator chamber (318) and atmospheric chamber (312). The movement of the partition (310) moves the valve head (309) relative to the valve orifice (311). The movement places the orifice (311) in different orientations which can be referred to as states of operation. The orifice (311) can reside in a closed orientation, an open orientation, and differing partially open orientations. The change in orifice orientations causes the pressure drop across the orifice (311) to change. The change serves to maintain the crankcase pressure at a constant pressure like the change in in the pressure drop across orifice (122c).

In operation the regulator assembly intake (304) and exhaust (306) orifice are upstream of the vacuum source (130). The inlet (304) and exhaust (306) orifice are downstream the crankcase (102) and filter element (324). The reference inlet (326) for the reference pressure which resides in fluid connection with pressure regulator chamber (318) and the crankcase (102). The tube (328) which forms the inlet (326) opens into the crankcase (102) at one end (328a) which has the tube inlet (326) and into the pressure regulator chamber (328b) at the other end. The vacuum source draws emissions out of the crankcase (102) and through the filter (324). The filtered emissions are drawn in through intake orifice (304) and into the hollow (300). From the hollow (300) the emissions are drawn out the exhaust orifice (306). As the emissions are drawn through the intake (304) and exhaust (306), the partition (310) moves up and down due to changes in pressure at the reference inlet (326). The partition (310) movement causes the valve head (309) to move up and down in the first (118) and second (120) axial directions. The valve head (309) movement causes changes in the pressure drop across the orifice (311). The changes cause the pressure in the crankcase (102) to remain constant or in a constant range. The above occurs without the aid of a spring.

The invention claimed is:

1. A pressure regulator for a crankcase integrated with a filter assembly comprising:
   an internal hollow having a first portion and a second portion delimited by a filter element housing;
   a filter element in said filter element housing;
   an atmospheric chamber delimited by a regulator housing;
   a pressure regulator chamber delimited by said regulator housing;
   a partition in said regulator housing fluidly sealing off said pressure regulator chamber from said atmospheric chamber;
   a valve assembly having a valve head and a valve orifice both in said internal hollow delimited by said filter element housing, said valve head connected to said partition; said valve orifice having a first open access and a second open access;
   a valve orifice closed orientation, a first partially open orientation, a second partially open orientation, and an open orientation;
   an intake orifice delimited by said filter element housing opening into said internal hollow first portion;
   an exhaust orifice delimited by said filter element housing opening into said internal hollow second portion;
   a reference inlet in fluid connection with said pressure regulator chamber; wherein,
   said valve orifice provides a fluid access to said filter element;
   said partition moveable in a first axial direction and a second axial direction opposite said first axial direction responsive to a change in a pressure differential between the pressure in the pressure regulator chamber and the pressure in the atmospheric chamber;
   movement of said partition in said first axial direction moves said valve head in a first axial direction, and said movement of said partition in said second axial direction moves said valve head in a second axial direction opposite said first valve head first axial direction;
   movement of said valve head in said first axial direction moves said valve head relative to said valve orifice to place said valve orifice into said partially first open orientation from said valve orifice closed orientation;

movement of said valve head in the first axial moves said valve head relative to said valve orifice to place said valve orifice into said second partially open orientation from said first partially open orientation;

movement of said valve head in said first axial direction moves said valve head relative to said valve orifice to orient said valve orifice from said second partially open position to said open position; and when said valve orifice is in said first partially open orientation, said second partially open orientation or open orientation, fluid prior to passing to said exhaust orifice passes through said valve orifice and then through a wall of said filter element.

2. The pressure regulator for the crankcase integrated with the filter assembly of claim 1, wherein,
when said valve orifice resides in the first partially open orientation, fluid flows less restricted through said valve orifice than when said valve orifice resides in said closed orientation.

3. The pressure regulator for the crankcase integrated with the filter assembly of claim 1, wherein,
when said valve orifice resides in said second partially open orientation, fluid flows less restricted through said valve orifice than when said valve orifice resides in said first partially open orientation.

4. The pressure regulator for the crankcase integrated with the filter assembly of claim 1, wherein,
when said valve orifice resides in said open orientation, fluid flows less restricted through said valve orifice than when said valve orifice resides in said second partially open orientation.

5. The pressure regulator for the crankcase integrated with the filter assembly of claim 1, wherein,
said valve head fills less of said valve orifice when said valve orifice resides in said first partially open orientation compared to when said valve orifice resides in said closed orientation.

6. The pressure regulator for the crankcase integrated with the filter assembly of claim 1, wherein,
said valve head fills less of said valve orifice when said valve orifice resides in said first partially open orientation compared to when said valve orifice resides in said closed orientation.

7. The pressure regulator for the crankcase integrated with the filter assembly of claim 1, wherein,
wherein said valve head fills less of said valve orifice when said valve orifice resides in said second partially open orientation compared to when said valve orifice resides in said first partially open orientation.

8. The pressure regulator for the crankcase integrated with the filter assembly of claim 1, wherein,
said valve head fills less of said valve head orifice when said valve orifice is in said open orientation compared to when said valve orifice in said second partially open orientation.

9. The pressure regulator for the crankcase integrated with the filter assembly of claim 1, wherein said valve head comprises:
a tapered continuous surface between a first end surface and a second end surface of said valve head.

10. The pressure regulator for the crankcase integrated with the filter assembly of claim 1, further comprising:
a tapered continuous side surface between a first and a second end surface, said tapered continuous side surface delimits said valve orifice.

11. The pressure regulator for the crankcase integrated with the filter assembly of claim 1, further comprising:
a tube extending into said atmospheric chamber, said reference inlet opening into said tube, said tube opening into said pressure regulator chamber.

12. The pressure regulator for the crankcase integrated with the filter assembly of claim 1, further comprising:
a tube extending through an end wall of said regulator housing, said tube having a first end which opens into said pressure regulator chamber, said tube also extends outside said regulator housing and outside the filter housing, from said first end, to orient said reference inlet opening into the tube at an access into said intake orifice.

13. A pressure regulator assembly comprising:
a main hollow delimited by part of said pressure regulator assembly;
an intake orifice opening into the main hollow;
an exhaust orifice opening out of said main hollow;
a regulator housing connected to said part of said pressure regulator assembly delimiting said main hollow, said regulator housing delimiting an atmospheric chamber and a pressure regulator chamber;
a partition seals off said atmospheric chamber from said pressure regulator chamber;
a valve head;
a valve stem connected to said partition;
a valve head connected to said valve stem;
a valve orifice provides an access through which fluid must flow prior to passing out said exhaust orifice;
a valve orifice closed orientation, a first partially open orientation, a second partially open orientation, and an open orientation; wherein,
movement of said partition in a first axial direction moves said valve head in a first axial direction, and said movement of said partition in a second axial direction moves said valve head in a second axial direction opposite said first valve head first axial direction;
movement of said valve head in said first axial direction moves said valve head relative to said valve orifice to place said valve orifice into said partially first open orientation from said valve orifice closed orientation;
movement of said valve head in the first axial direction moves said valve head relative to said valve orifice to place said valve orifice into said second partially open orientation from said first partially open orientation;
movement of said valve head in said first axial direction moves said valve head relative to said valve orifice to orient said valve orifice from said second partially open orientation to said open orientation.

14. The pressure regulator assembly of claim 13, wherein said valve head has a surface which prevents fluid from passing through said valve head.

* * * * *